US006406660B1

United States Patent
Spurgeon (10) Patent No.: US 6,406,660 B1
(45) Date of Patent: Jun. 18, 2002

(54) METHOD FOR PRODUCING POLYMER MATRIX COMPOSITES HAVING LOW VOLUME PERCENTAGE OF REINFORCEMENT FIBER AND CONTROLLED THICKNESS

(75) Inventor: William A. Spurgeon, Newark, DE (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/499,171

(22) Filed: Feb. 7, 2000

(51) Int. Cl.[7] .................. B29C 43/12; B29C 43/56; B29C 70/44
(52) U.S. Cl. .............. 264/510; 264/571; 264/138; 264/152; 264/257; 264/258
(58) Field of Search .................. 264/510, 511, 264/571, 257, 258, 138, 152, 102

(56) References Cited

U.S. PATENT DOCUMENTS

| | | | | |
|---|---|---|---|---|
| 4,065,340 A | * | 12/1977 | Dickerson | 156/154 |
| 4,311,661 A | * | 1/1982 | Palmer | 264/510 |
| 4,765,942 A | * | 8/1988 | Christensen et al. | 264/510 |
| 4,902,215 A | | 2/1990 | Seemann, III | 425/406 |
| 4,942,013 A | * | 7/1990 | Palmer et al. | 264/511 |
| 5,052,906 A | | 10/1991 | Seemann | 425/112 |
| 5,236,666 A | * | 8/1993 | Cochran et al. | 264/102 |
| 5,316,462 A | | 5/1994 | Seemann | 425/112 |
| 5,393,215 A | * | 2/1995 | Donovan, Sr. | 425/429.1 |
| 5,439,635 A | | 8/1995 | Seemann | 264/510 |
| 5,454,895 A | * | 10/1995 | Imparato | 156/156 |
| 5,601,852 A | | 2/1997 | Seemann | 425/112 |
| 5,702,663 A | | 12/1997 | Seemann | 264/510 |
| 5,759,325 A | * | 6/1998 | Davis | 156/154 |
| 5,885,513 A | * | 3/1999 | Louderback et al. | 264/459 |
| 6,017,484 A | * | 1/2000 | Hale | 264/510 |
| 6,090,335 A | * | 7/2000 | McClure et al. | 264/510 |
| 6,265,333 B1 | * | 7/2001 | Dzenis et al. | 442/346 |

\* cited by examiner

Primary Examiner—Jan H. Silbaugh
Assistant Examiner—Stefan Staicovici
(74) Attorney, Agent, or Firm—Paul S. Clohan, Jr.; William V. Adams; U. John Biffoni (57) ABSTRACT

A method of forming fiber reinforced polymer matrix composite structures having a low volume fraction of fiber reinforcement and carefully controlled thicknesses is provided. The method enables the production of composite structures having a fiber volume fraction of less than about 0.5 through the use of vacuum bag molding, thereby eliminating the need for expensive closed molds, The method also eliminates the occurrence of "racetracking" of uncured resin during the resin infusion process.

18 Claims, 5 Drawing Sheets

METHOD FOR PRODUCING POLYMER MATRIX COMPOSITES HAVING LOW VOLUME PERCENTAGE OF REINFORCEMENT FIBER AND CONTROLLED THICKNESS

GOVERNMENT INTEREST

The invention described herein may be manufactured, used, and/or licensed by or for the United States Government.

FIELD OF THE INVENTION

This invention relates generally to vacuum bag methods of producing fiber reinforced polymer matrix composite parts, and, more particularly, to vacuum bag methods capable of accurately controlling part thickness and producing parts having a low volume fraction of fiber reinforcement.

BACKGROUND OF THE INVENTION

The volume fraction of reinforcement fiber in a composite is a variable which composite fabricators seek to control since it does much to determine the physical properties of the composite. It is most often desirable to have a high volume fraction of fiber so that the composite will be very strong and stiff. However, there are other applications, such as a skirt to cover the tracks of an armored vehicle, for which it is desirable to have a relatively low fiber volume percentage so that the part can be flexible. Furthermore, there are also occasions when it is necessary to control the thickness of a composite part very carefully.

Composites made by standard vacuum bag methods, using either wet resin lay-ups or prepreg technology and typical reinforcement fabrics, will usually contain about 50% fiber by volume. This percentage can be increased by the application of pressure using standard composite processing equipment such as a compression press or an autoclave during the cure cycle, i.e., the period of time in which the matrix resin reacts so that the viscosity increases from that of a liquid to that of a solid. Alternatively, a composite fabricator can place a bleeder fabric between the wet part and the vacuum bag to bleed out excess resin through the part and thus increase the fiber volume fraction prior to curing it.

However, these vacuum bag methods are obviously not satisfactory for making a composite part with a lower volume fraction of reinforcement fiber. Moreover, adding a large excess of resin to a wet resin or prepreg lay-up to produce a lower fiber volume fraction generally results in a poor quality part that is hard to reproduce and that typically has a high void content. Although some control over the fiber volume fraction can be obtained by using a fabric with a different weave pattern, for example, a 0-90-stitched fabric as opposed to a plain weave fabric, this technique is also generally inadequate to produce composites having low fiber volume fraction.

Vacuum assisted resin transfer molding (VARTM) or variations on this process, result in a fiber volume fraction determined by the applied pressure and the fabric type. VARTM can be broken down into five basic steps. In the first step, a dry preform is manufactured which conforms to the shape of the tool or rigid plate on which the part is produced. The second step is to place the preform on the rigid side of the tool. In the third step, the preform is sealed against the tool with a vacuum bag. Thus, the difference between traditional Resin Transfer Molding (RAM and VARTM is two-sided versus one-sided tooling, respectively. The vacuum bag is a membrane that is used to allow a vacuum to be drawn, meaning that the preform will be evacuated. Next, the thermosetting polymer resin is infused into the preform. The process uses the vacuum on the inside and atmospheric pressure outside to provide the pressure gradient required for flow. The vacuum also provides for the consolidation pressure. This is usually performed at room temperature, although, provided there is a big enough oven, elevated temperature can be used. Next, the part is cured; this also can be done at either room or elevated temperatures depending on the requirements of the resin. As can be expected, the resin system selected plays a role in the processing conditions, and this does limit the resins available for use in VARTM. Finally, the cured near net shape part is removed from the tool and any post processing can be done. In addition, some finishing operations may be required, in that there is only one good surface finish supplied by the mold and the other surface is a vacuum bag surface. The most popular type of VARTM currently in use is Seeman's Composite Resin Infuision Molding Process ("SCRIMP"®), which is described in U.S. Pat. Nos. 4,902,215; 5,052,906; 5,316,462; 5,439,635; 5,601,852; and 5,702,663; hereby expressly incorporated by reference.

The degree of control over the fiber volume and part thickness obtained by methods that do not use a closed mold is minimal, however. Resin transfer molding is often an alternative to vacuum bag methods. RTM can be broken down into the same basic five basic steps, as in VARTM, except that a two-part rigid mold or tool is used. The injection is performed under heat and pressure, typically the resin may be injected anywhere from 15 psi to 250 psi. During the cure cycle, the resin will react and polymerize into a solid structure. This reaction may need increased heat and pressure to react in an optimum fashion. Finally, the cured near net shape part is removed from the tool and any required post processing can be done. The finishing operations are minimal due to the near net shape of the component and the good surface finish supplied by the mold. The volume fraction of fiber in a composite part made by the RTM method can be controlled by the amount of compression the mold provides to the dry fabric. The mold also determines the part thickness. However, this process requires a relatively expensive closed mold, which could be an unacceptable expense if only a few parts are needed.

The present invention provides a reproducible method of fabricating composite parts having a low volume fraction of reinforcement fiber and carefully controlled thicknesses, and does so using inexpensive vacuum bag methods as opposed to closed molds.

SUMMARY OF THE INVENTION

It is an object of the present invention to provide a repeatable and inexpensive method of fabricating polymer resin matrix composite parts having a controlled, low volume percentage of fiber reinforcement.

It is another object of the present invention to provide an inexpensive method of fabricating polymer matrix composite parts having carefully controlled thicknesses.

It is still another object of the present invention to provide an inexpensive method of producing polymer resin matrix composite parts having reinforcement fiber volume fractions less than 0.50 and without objectionable void content.

It is yet another object of the present invention to provide a vacuum bag method of fabricating composite parts which prevents the common "racetracking" phenomena of resin flow, i.e., the flow of resin around the periphery of the fabric stock rather than through it.

Accordingly, this and other objects of the present invention are achieved by using standard vacuum assisted resin transfer molding (VARTM) techniques with simple and inexpensive improvements. In particular, rigid supports or spacers, typically metal bars or rods, are placed on two opposite sides of the fabric stack. The fill line and vacuum line are then placed on the opposite unsupported sides of the assembly. Finally, a rigid cover plate, also typically metal, is placed over the assembly so that it rests on the supports. Adding these elements to a typical vacuum bag molding system enables fabrication of parts having a low volume percentage of reinforcement fiber and controlled thickness. In addition, "racetracking" can be prevented by cutting the fabrics to a particular pattern and supporting the cover plate in a slightly different manner as will be disclosed herein.

Further objects, features and advantages of the present invention will become apparent from the following detailed description taken in conjunction with the accompanying drawings.

DETAILED DESCRIPTION OF THE PREFERRED EMBODIMENTS

The present invention provides a novel, low cost method for making polymer resin composite parts having a low reinforcement fiber volume fraction, low void content, and wherein said parts have a carefully controlled thickness. The present method allows fabrication of composite parts having a reinforcement fiber volume fraction lower than 0.5, and can be used with any resin useful in VARTM processes, i.e., those having a viscosity low enough to fill the part. Typically, resins with a viscosity under 500 centipoise may be used. In addition, considerable cost savings are achieved because the present invention is based on vacuum bag methods and does not require expensive closed molds. This is particularly desirable in situations where only a relatively small number of composite parts must be produced.

Figure 1:
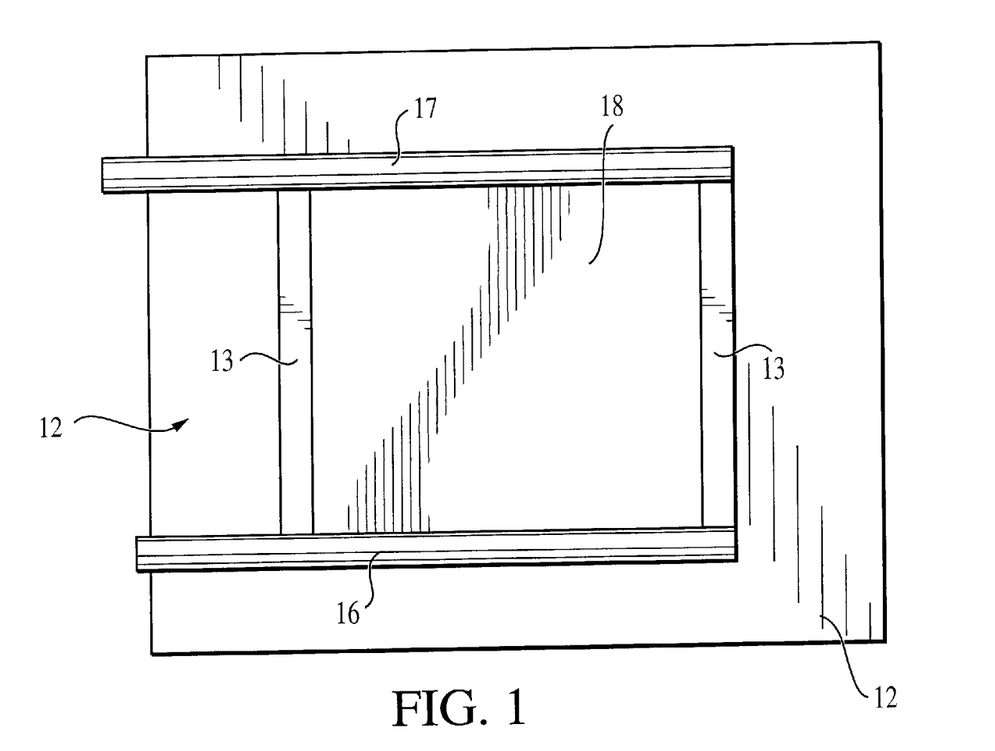
FIG. 1 is a top view of one embodiment of the present invention, i.e., a device for making a flat panel composite part having a low volume percentage of reinforcement fibers.
Figure 2:
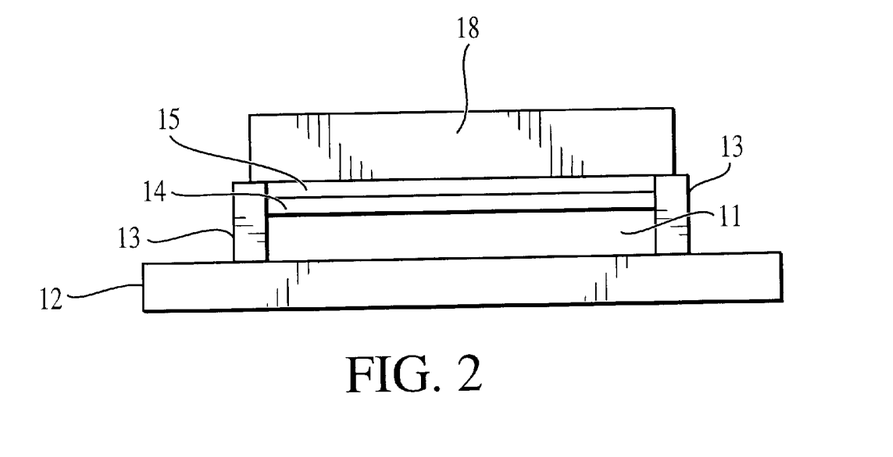
FIG. 2 is a side view of the embodiment of the invention shown in FIG. 1 with fill line 16 and vacuum line 17 removed for clarity.

The present invention employs vacuum assisted resin transfer molding (VARTM) or variations on this process, such as the "SCRIMP" process described in U.S. Pat. No. 4,902,215, to fill the part with resin. Referring now to FIG. 1, there is shown a top view of the apparatus of one embodiment of the present invention. The apparatus or device includes a rigid bottom plate or tool 12, a fill line 16, a vacuum line 17, a rigid top plate or tool 18, and two rigid support bars or spacers 13. FIG. 2 provides a side view of the same device with fill line 16 removed for clarity. Shown in FIG. 2 are the cut reinforcement fabrics 11, which provide the fiber reinforcement to the finished part, rigid plate 12, rigid supports or spacers 13, porous release fabric 14, distribution medium 15, and rigid top plate 18. For a flat panel part, the reinforcement fabrics 11 are first cut slightly larger than the desired part size. For example, referring now to FIG. 2, the desired number of plies of cut fabrics 11 are then stacked on the rigid bottom plate 12, which is typically metal. Rigid supports (or spacers) 13, also typically metal, are placed on the bottom plate 12 along two opposite sides of the fabric stack 11. For this embodiment, the rigid spacers 13 comprise bars, which may run the length of the fabric stack 11. One or more plies of a porous release fabric 14 and a layer of distribution medium 15, cut no larger than the reinforcement fabrics 11, may then be placed on top of the fabric stack 11, as described in the in the SCRIMP process. A fill line 16 is placed on one of the unsupported sides and a suitable vacuum line 17 is placed on the other unsupported side. A rigid top cover plate 18, typically metal, is then placed over the assembly so that it rests on the rigid supports 13. The rigid top plate 18 should be wider than the fabrics, and just slightly longer so that it rests on the supports 13. Following standard VARTM practice, the assembly is then vacuum bagged, evacuated, and infused with resin that is then cured. Finally, the part is debagged and trimmed to size. It should be understood that parts having shapes other than a flat panel can be formed using the present invention by using an appropriately shaped rigid tool 12 (rather than plate) and top cover tool 18 (rather than plate) and rigid spacers 13.

Figure 3:
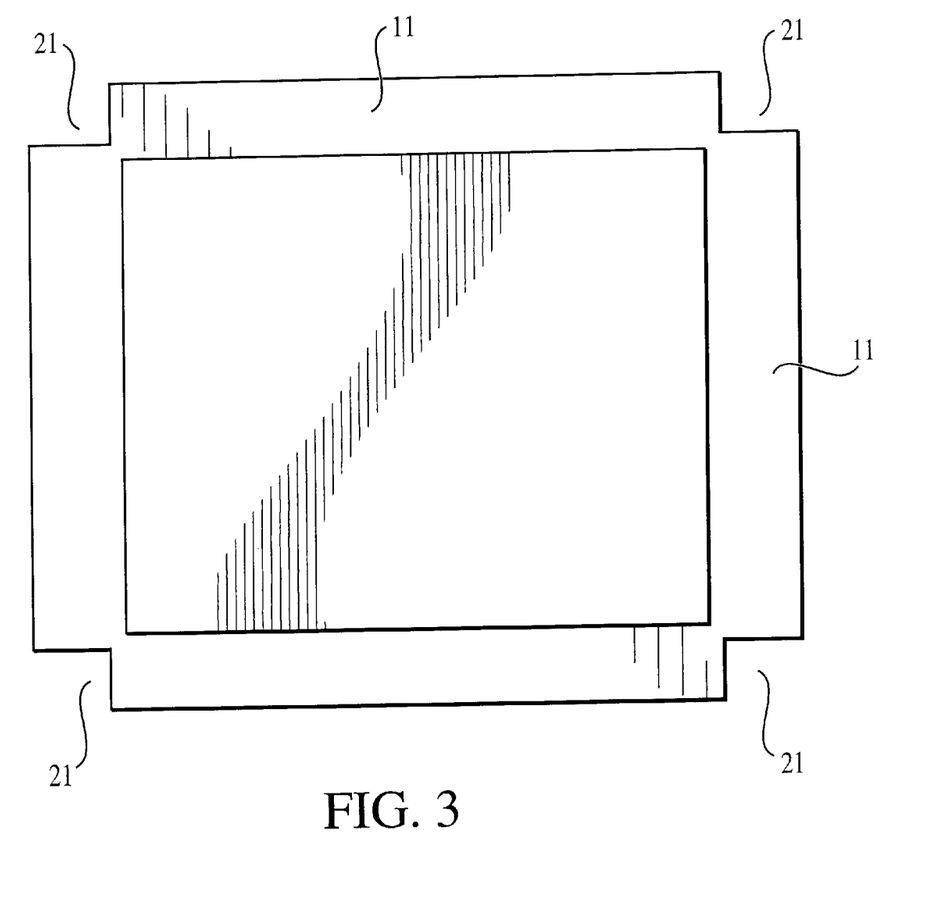
FIG. 3 is a top view of the basic cutting pattern for the fabric used to make the composite part when "racetracking" must be avoided. The intended part is shown as the shaded region on the figure.
Figure 4:
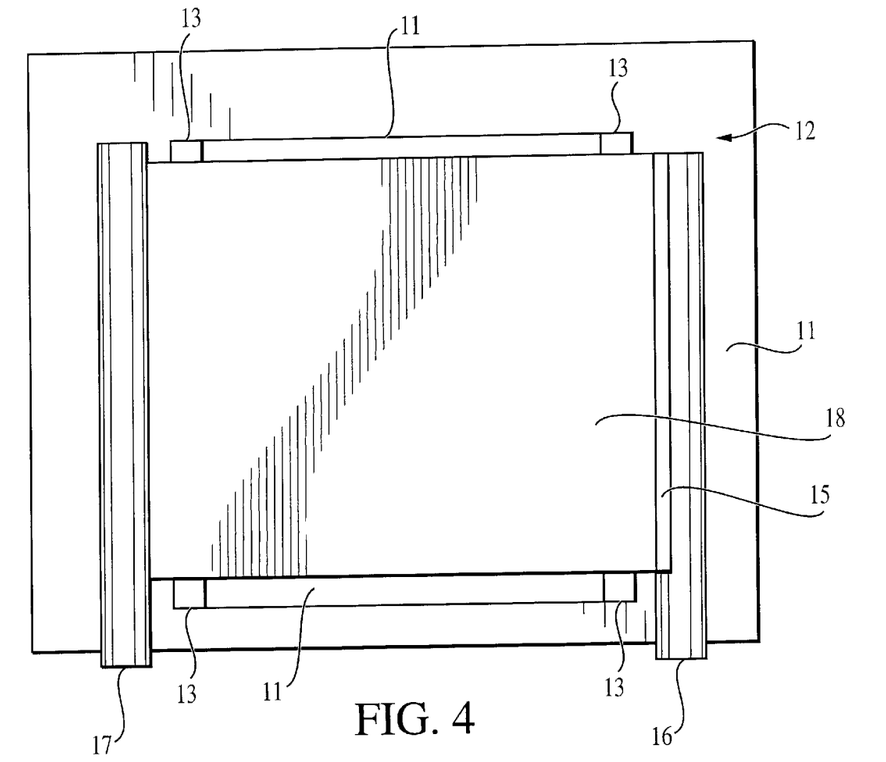
FIG. 4 is a top view of a second embodiment of the present invention which uses reinforcement fabric cut in the pattern shown in FIG.3 to prevent the resin "racetracking" phenomena while also producing low fiber volume panels.
Figure 5:
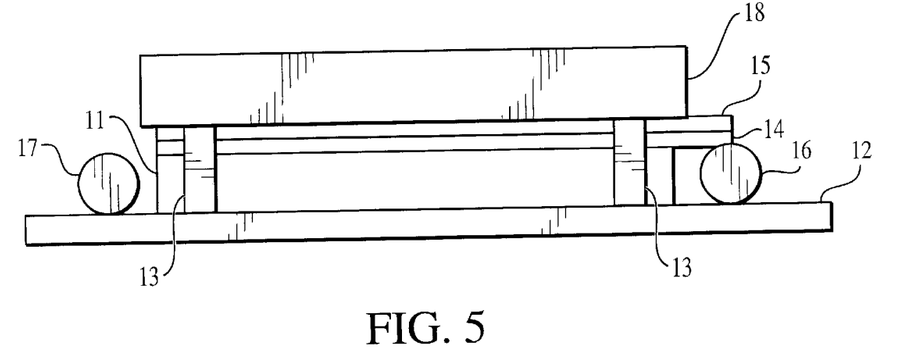
FIG. 5 is a side view of the embodiment of the invention shown in FIG. 4.

Invariably, a small space or gap is left between the cut fabric stack 11 and the rigid supports 13 shown in FIG. 2. It is possible for resin to flow preferentially through this space from the fill line 16 to the vacuum side 17 instead of flowing through the fabric stack 11, 14, and 15, a process known as "racetracking". Since the resulting part is not completely filled with resin, it is not the desired product. It is thus important that this space be minized, or that the "racetracking" be otherwise prevented. It is possible to avoid this "racetracking" altogether by cutting the fabrics to a particular pattern and supporting the cover plate in a slightly different manner. For a flat panel, the fabrics are first cut as shown in FIG. 3. The intended part size is shown as the shaded region within the cut fabrics 11, which have notches 21 on each corner. Referring now to FIGS. 4 and 5, the desired number of plies of cut fabrics 11 are then stacked on a rigid bottom plate 12. The fabrics 11 are typically two inches larger on each side than the desired part size. The notches 21 in the fabric are typically 1.5 inches deep and 1 inch wide. These notches 21 will hold rigid supports 13 (typically metal), which in turn support the rigid cover plate 18 (also typically metal). Rigid support spacers 13 are placed in the notches 21 in the fabric plies 11, and will determine the thickness of the panel by creating a fixed space along with the bottom plate 12 and the top-plate 18. For this embodiment, the rigid spacers 13 are sized to fit within the notches 21 and do not run the length of the fabric stack 11. For simple vacuum assisted resin transfer molding, rigid cover plate 18 is then placed over the spacers 13. One or more layers of a porous release material 14, also cut to the pattern of FIG. 3 could be placed over the reinforcement fabrics 11 if desired, for example, to give the upper surface a slight texture.

Alternatively, for a SCRIMP-like process, one or more layers of a porous release material 14 cut to the pattern of FIG. 3 are first placed over the cut fabrics 11. A layer of an appropriate transfer medium material (distribution medium) 15 is placed over the release material 14. This is cut to the size of the finished part plus a little extra on one side to join to the fill line 16, as shown in FIG. 5. The rigid cover plate 18 is then placed over the metal spacers 13. A resin fill-line 16 and a vacuum line 17 are placed adjacent to the part, as depicted in FIGS. 4 and 5, and the entire assembly is vacuum bagged (not shown). The bag should clamp down hard on the exposed fabric edges, i.e., those portions of the cut fabrics 11 visible in the top view shown in FIG. 4, right up to the edge of the top cover plate 18. This helps prevent "racetracking" of the resin and helps ensure a complete fill-out of the fabric 11. It is also helpful to place several strips of fabric into the exposed edges of the fabric stack at regular intervals. These strips are the size of the exposed edges and are inserted to prevent the vacuum from pushing down the fabric 11 under the cover plate 18. The number of such strips required will vary with the part, but enough should be inserted so that the edges will be about as thick as the support spacers 13 when it is placed under vacuum. This also increases the impedance to flow at these edges of the part and thus helps eliminate "racetracking." Following standard SCRIMP practice, the bag is then evacuated and resin is infused into the part. The part is then cured, cooled if the resin required heat to set (thermoset), de-bagged, and trimmed to size.

Although the above description is for a flat plate part, it should be clear that a shaped part could also be made by this method. All that is needed are appropriately shaped rigid male and female top and bottom plates and some rigid spacers. A costly closed mold as in RTM is not required.

With fabrics such as a 24 ounce 5×5 woven roving, fiber volume percentages from about 37 to 50% have been obtained by the methods of the present invention. Lower volume percentage composites can be obtained using a chopped strand mat or other high bulk factor reinforcements or preforms. The process has also proven to be repeatable, producing consistent product.

Figure 6:
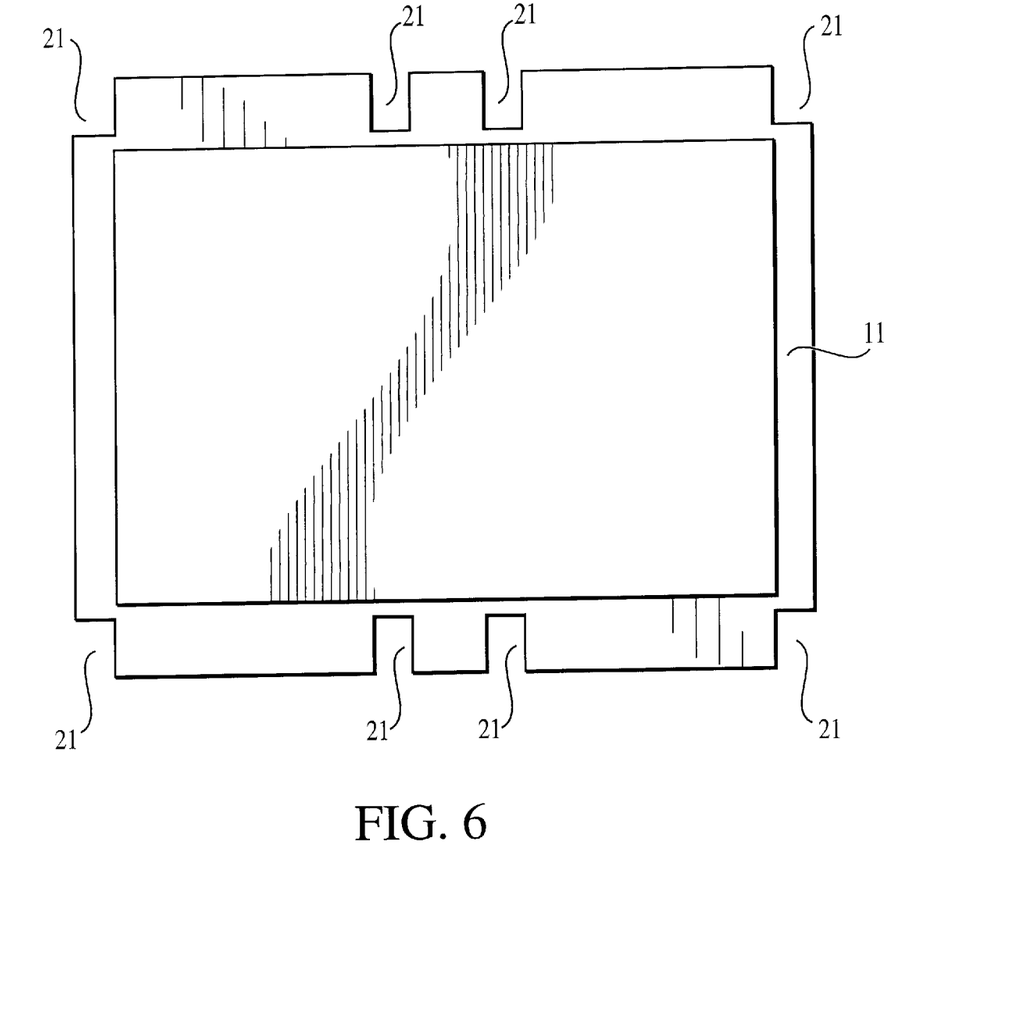
FIG. 6 is a top view of the basic cutting pattern for fabrics when fabricating large flat panel composite parts.
Figure 7:
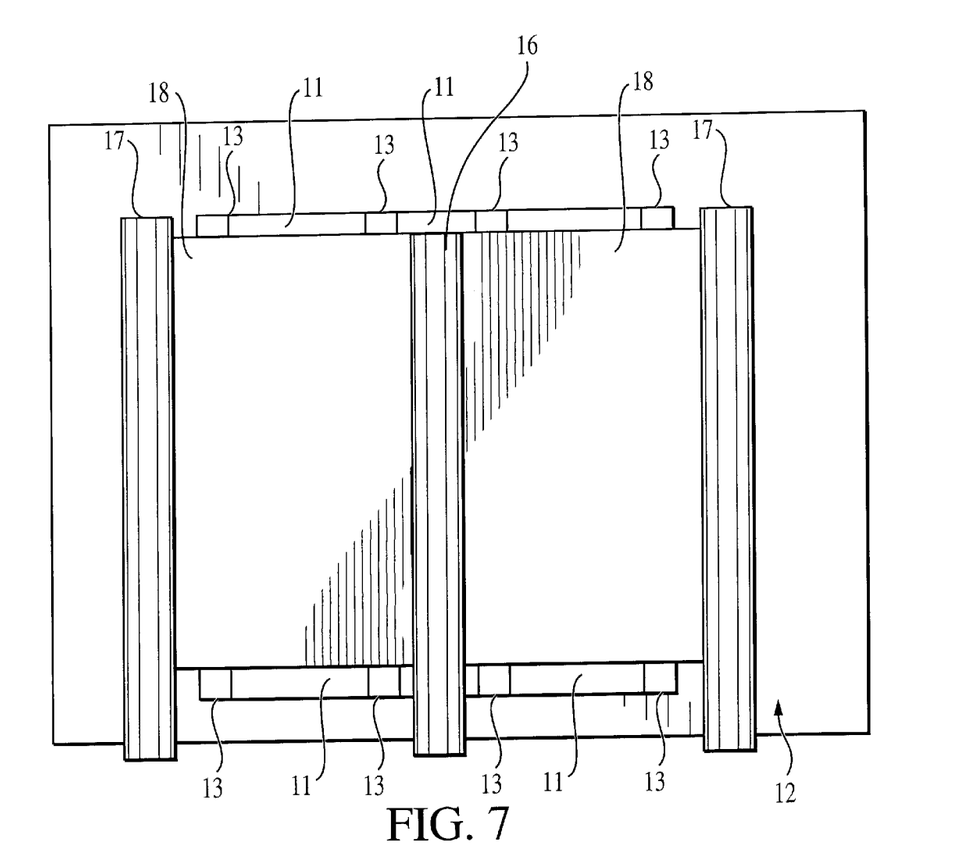
FIG. 7 is a top view of a third embodiment of the present invention which uses reinforcement fabric cut in the pattern of FIG. 6, and is useful for fabricating large flat panel composite parts while preventing resin "racetracking."
Figure 8:
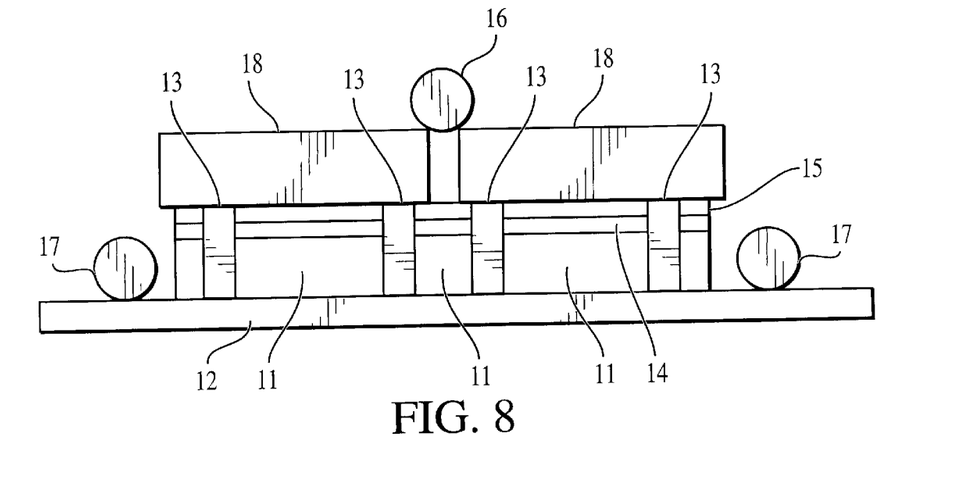
FIG. 8 is a side view of the embodiment of the invention shown in FIG. 7.

For a large panel part, the new method is modified slightly as shown in FIGS. 6, 7 and 8. Referring now to these figures, the cut reinforcement fabrics 11 and release fabric 14 are cut to the pattern in FIG. 6. The desired part size and shape is shown as the shaded area of FIG. 6. The distribution medium 15 is cut half an inch to an inch smaller than the finished part on all sides. The cover plate 18 is in two sections (or more if the part is very large). Support spacers 13 are placed within the notches 21 in the fabric stack 11, and do not extend beyond the notched area. The fill line 16 is placed over the space between the top cover plates 18 so that uncured resin is infused into the fabric stack 11 at a mid-point. The vacuum lines 17 are placed at the edges of the panel. Extra strips of fabric are placed within the exposed edges of the stack of cut fabrics 11, those visible in the top view of FIG. 7. The part is then vacuum bagged (not shown) and infused with resin through fill line 16 (drawn in vacuum lines 17). The resin is then cured. Finally, the part is de-bagged and trimmed to size.

It should be noted that all physical properties of composites that depend on the volume fraction of reinforcement fiber can be controlled by this new method. This includes electrical, mechanical and thermal properties. Furthermore, the thickness of the finished part is also carefully controlled.

EXAMPLE 1

In the first example, six plies of 24 ounce 5×5 woven roving about 16 inches square were cut in the pattern of FIG. 3. Aluminum support spacers, each ¼-inch thick were placed in each of the 4 notches in the fabric. Two plies of Richmond Products type A-8888 release fabric (obtained from Northern Fiberglass Sales, Inc., PO Box 2010, Hampton, N.H. 03843-0598) were cut to the pattern of FIG. 3 and placed over the fabrics. A layer of 50% shade awning mesh (obtained from Roxford Fordell, 16 Pelham Davis Circle, Greenville, S.C. 29615), was then placed on top of the stack to serve as a distribution medium. It was cut to the size of the final part plus one-inch on the one side that abutted the fill line. This was then covered with a 13-inch square, 0.625-inch thick aluminum cover plate that rested on the 4 quarter-inch thick aluminum support spacers. Two strips of the woven roving were placed within the exposed edges of the stack and two more of the woven roving strips were placed over the top of the edges. A fill line was made by taking a 12 inch piece of 0.5-inch inner diameter spiral electrical wire wrap (Panduit Type T62F, obtained from Graybar Electric, 43 Boulden Blvd, PO Box 900, New Castle, Del. 19720) that had been stretched to a length of 16 inches. This was then wrapped with several layers of the 50% shade awning mesh material. One inch of the spiral wrap was wrapped around a piece of 0.5-inch OD by 0.375-inch ID polyethylene tubing at the end nearest the resin source. A similar piece of spiral electrical wire wrap was wrapped with several layers of type 7781 E-glass fabric and joined to a piece of polyethylene tubing for a vacuum line. The fill and vacuum lines were put in place and the assembly was then vacuum bagged and infused with polyester resin and cured. After the part had cooled, the edges were trimmed, leaving a 12 inch square composite plate 0.197 inches thick, which had a fiber volume percentage of 38.4%+/–0.6%. A part made by a conventional SCRIMP process using 10 plies of the fabric was 0.249 inches thick and had a fiber volume percentage of 50.6% A 0.15%.

EXAMPLE 2

In a second example, 15 plies of 8-ounce style 6781 S-2 glass fabrics were cut to the pattern of FIG. 3. As shown in FIGS. 4 and 5, the cut fabric plies were covered with release films, distribution medium, and an aluminum cover plate supported by 4-quarter inch thick aluminum spacers. Ten additional strips of cut type 6781 fabric were stuffed at regular intervals into the exposed edges of the fabric. Fill and vacuum lines were put in place and the assembly was vacuum bagged, infused, cured and de-bagged as in the previous example. The resulting part had a glass content of 36.4+/–0.2%. An identical panel was also made from 15 plies of the same glass fabric by the device depicted in FIG. 1. The parts were translucent, indicating a low void content.

EXAMPLE 3

In a third example, 15 plies of the type 6781 S-2 glass fabric were cut 11.5 inches square and stacked as in FIG. 1. They were then covered with the release fabric and distribution medium. Two aluminum support spacers, 0.25 inches thick by two inches wide by 12 inches long, were placed adjacent to the part. A 13-inch square by 0.625-inch thick cover plate was placed on top of the spacers. Fill and vacuum lines, as in the previous examples, were placed adjacent to the fabrics as shown in FIG. 1. The part was infused with a polyurethane resin, cured, cooled and trimmed to size. It was found to contain 33.3+/−0.2% glass by volume, as expected.

EXAMPLE 4

In a fourth example, 4 plies of a chopped strand E-glass mat were cut as in FIG. 3, put in place, vacuum bagged and infused as in the two previous examples. The finished part contained 30.0+/−0.5 volume % glass. A part made using this glass mat made by a conventional SCRIMP process contained 41.9+/−0.4% glass by volume.

It will be apparent to one skilled in the art that various changes, alterations, and modifications of the present invention are possible in light of the above teachings. It is therefore to be understood that while the invention has been described in this specification with some particularity, it is not intended to limit the invention to the particular embodiments provided herein. On the contrary, it is intended to cover all alternatives, modifications, and equivalents as may be included within the spirit and scope of the invention as defined in the appended claims.

What is claimed is:

1. A method of forming a fiber reinforced composite structure having a low volume fraction of fiber by vacuum bag molding, comprising the steps of:
   (a) cutting reinforcement fabrics to a basic pattern;
   (b) placing said cut reinforcement fabrics against a tool surface;
   (c) covering said reinforcement fabrics with porous release fabric;
   (d) covering said release fabric with distribution medium;
   (e) placing a rigid support spacer along a first side of said cut reinforcement fabrics and placing another rigid support spacer along a second side opposite said first side, said spacers running substantially the length of said sides;
   (f) placing a fill line along a third side of said cut reinforcement fabrics and a vacuum line along a fourth side opposite said third side;
   (g) placing a rigid cover tool on top of said support spacers, said cover tool resting on said support spacers and covering said fabrics and distribution medium to produce an assembled fiber lay-up;
   (h) placing a vacuum bag over said fiber lay-up and sealing said bag against said tool surface;
   (i) drawing uncured resin under vacuum through said fill line to infuse said fiber lay-up with resin; and
   (j) curing said resin infused lay-up; and wherein the fiber reinforced composite structure formed has a fiber volume fraction of less than about 0.5.

2. The method of claim 1, wherein said reinforcement fabrics are cut to a size larger than the desired composite structure, and wherein said release fabric and distribution medium are no larger than said reinforcement fabrics.

3. The method of claim 1, wherein said rigid support spacers and said rigid cover tool are comprised of metal.

4. The method of claim 1, wherein said tool surface and said rigid cover tool comprise flat plates.

5. The method of claim 1, wherein said tool surface and said rigid cover tool comprise mating shaped surfaces.

6. The method of claim 1, wherein said rigid cover tool is wider and longer than said fabrics.

7. A method of forming a fiber reinforced composite structure having a low volume fraction of fiber by vacuum bag molding, comprising the steps of:
   (a) cutting reinforcement fabrics to a basic pattern such that said reinforcement fabrics have a plurality of side edges, said pattern being larger than a desired structure size and including notched areas where fabric has been cut out, said notches being outside the area of the desired structure size;
   (b) placing said cut reinforcement fabrics against a tool surface;
   (c) placing a rigid support spacer within each of the notched areas of said reinforcement fabric pattern;
   (d) covering said reinforcement fabrics with release fabric;
   (e) covering said release fabric with distribution medium;
   (f) placing a fill line along a first side of said cut reinforcement fabrics and a vacuum line along a second side opposite said first side;
   (g) placing a rigid cover tool on top of said supports, said cover tool resting on said support spacers and being about the size of the desired structure thereby producing an assembled fiber lay-up with the side edges of the reinforcement fabrics exposed;
   (h) placing a vacuum bag over said fiber lay-up and sealing said bag against said tool surface;
   (i) drawing uncured resin under vacuum through said fill line to infuse said fiber lay-up so that said resin infusion occurs without racetracking; and
   (j) curing said resin infused lay-up; and wherein the fiber reinforced composite structure formed has a fiber volume fraction of less than about 0.5.

8. The method of claim 7, wherein said reinforcement fabrics are cut to a size about two inches larger on each side than the desired structure size.

9. The method of claim 7, further comprising placing additional strips of fabric onto the exposed edges of said fabric stack so that the thickness of the stack at the exposed edges equals that of the spacers.

10. The method of claim 7, wherein said rigid support spacers and said rigid cover tool are comprised of metal.

11. The method of claim 7, wherein said tool surface and said rigid cover tool comprise flat plates.

12. The method of claim 7, wherein said tool surface and said rigid cover tool comprise mating shaped surfaces.

13. A method of forming a large fiber-reinforced composite structure having a low volume fraction of fiber reinforcement by vacuum bag molding, comprising the steps of:
   (a) cutting reinforcement fabrics to a basic pattern, said pattern being larger than the desired structure size and including notched areas where fabric has been cut-out, said notches being outside the area of the desired structure size;
   (b) placing said cut reinforcement fabrics against a tool surface;
   (c) placing a rigid support spacer within each of the notches cut out of said reinforcement fabric pattern;
   (d) covering said reinforcement fabrics with release fabric;

(e) covering said release fabric with distribution medium;

(f) placing at least two rigid cover tools on top of said support spacers, said cover tools positioned adjacent to one another with a space therebetween and resting on said support spacers, and said cover tools covering an area about the size of the desired structure producing an assembled fiber lay-up with edges of the fabric stack exposed;

(g) placing a fill line over said space between said cover tools;

(h) placing vacuum lines along two opposite sides of said fabrics to produce an assembled fiber lay-up;

(i) placing a vacuum bag over said fiber lay-up and sealing said bag against said tool surface;

(j) drawing uncured resin under vacuum through said fill line to infuse said fiber lay-up with resin so that said resin infusion occurs without racetracking; and (k) curing said resin infused fiber lay-up; and wherein the fiber reinforced composite structure formed has a fiber volume fraction of less than about 0.5.

14. The method of claim 13, wherein said reinforcement fabrics are cut to a size about two inches larger on each side than the desired structure size.

15. The method of claim 13, further comprising placing additional strips of fabric onto the exposed edges of the reinforcement fabrics so that the thickness of the reinforcement fabrics at the exposed edges equals that of the spacers.

16. The method of claim 13, wherein said rigid support spacers and said rigid cover tools are comprised of metal.

17. The method of claim 13, wherein said rigid tool surface and said rigid cover tools comprise flat plates.

18. The method of claim 13, wherein said rigid tool surface and said rigid cover tools.

* * * * *